(12) United States Patent
McLellan et al.

(10) Patent No.: US 10,776,119 B2
(45) Date of Patent: Sep. 15, 2020

(54) COMBINED CONDITIONAL BRANCH AND INDIRECT BRANCH TARGET PREDICTOR

(71) Applicant: MARVELL ASIA PTE. LTD., Singapore (SG)

(72) Inventors: Edward J. McLellan, Holliston, MA (US); David A. Carlson, Haslet, TX (US); Rohit P. Thakar, Shrewsbury, MA (US)

(73) Assignee: MARVELL ASIA PTE, LTD., Singapore (SG)

( * ) Notice: Subject to any disclaimer, the term of this patent is extended or adjusted under 35 U.S.C. 154(b) by 169 days.

(21) Appl. No.: 16/009,826

(22) Filed: Jun. 15, 2018

(65) Prior Publication Data
US 2019/0384609 A1    Dec. 19, 2019

(51) Int. Cl.
*G06F 9/38*     (2018.01)
*G06F 9/30*     (2018.01)

(52) U.S. Cl.
CPC ........ *G06F 9/3806* (2013.01); *G06F 9/30058* (2013.01)

(58) Field of Classification Search
CPC .. G06F 9/3806; G06F 9/30058; G06F 9/3844; G06F 9/30061
See application file for complete search history.

(56) References Cited

U.S. PATENT DOCUMENTS

| | | | | |
|---|---|---|---|---|
| 6,067,616 A * | 5/2000 | Stiles | .................... | G06F 9/3804 711/119 |
| 6,178,498 B1 * | 1/2001 | Sharangpani | ......... | G06F 9/3005 711/213 |
| 2003/0163671 A1 * | 8/2003 | Gschwind | ............. | G06F 9/3836 712/214 |
| 2005/0268075 A1 * | 12/2005 | Caprioli | ................ | G06F 9/3806 712/239 |
| 2011/0320792 A1 * | 12/2011 | Bonanno | ............... | G06F 9/3806 712/240 |

(Continued)

OTHER PUBLICATIONS

Seznec et al, "A case for (partially) TAgged GEometric history length branch prediction", 2006 (Year: 2006).*

(Continued)

*Primary Examiner* — Farley Abad
(74) *Attorney, Agent, or Firm* — Hamilton, Brook, Smith & Reynolds, P.C.

(57) ABSTRACT

An example embodiment combines use of a branch predictor with cache-like storage of previously executed branch targets to improve processor performance while minimizing hardware cost. The branch predictor is configured to predict both conditional branch and indirect branch targets and includes a combined predictor table configured to store at least one tagged conditional branch prediction in combination with at least one tagged indirect branch target prediction. The at least one tagged indirect branch target prediction is configured to include a predicted partial target address of a complete target address, the complete target address associated with an indirect branch instruction of a processor. The predictor includes prediction logic configured to use the predicted partial target address to produce a predicted complete target address of the complete target address for use by the processor prior to execution of the indirect branch instruction.

51 Claims, 10 Drawing Sheets

(56) References Cited

U.S. PATENT DOCUMENTS

| | | | |
|---|---|---|---|
| 2015/0121050 A1* | 4/2015 | Williams | G06F 9/30058 |
| | | | 712/238 |
| 2015/0293854 A1* | 10/2015 | Kalamatianos | G06F 12/0864 |
| | | | 714/723 |
| 2016/0246722 A1* | 8/2016 | Bonanno | G06F 12/084 |
| 2017/0090935 A1 | 3/2017 | Falsafi et al. | |

OTHER PUBLICATIONS

Narayanan, "Path History Based Predictor", 1999 (Year: 1999).*

Chen, I-C K., et al., "Analysis of Branch Prediction via Data Compression," ASPLOS VII Proceedings of the Seventh International Conference on Architectural Support for Programming Languages and Operating Systems, pp. 128-137 (Oct. 1996).

Michaud, P., "Analysis of a Tag-Based Branch Predictor," Research Report, Institut National De Recherche En Informatique Et En Automatique, 24 pages (Nov. 2004).

Michaud, P., "A PPM-Like, Tag-Based Branch Predictor," Journal of Instruction-Level Parallelism 7: 1-10 (2005).

Seznec, A. and Michaud, P., "A case for (partially) TAgged GEometric history length branch prediction," http://www.irisa.fr/caps/people/seznec/JILP-COTTAGE.pdf [Downloaded Feb. 6, 2018].

* cited by examiner

COMBINED CONDITIONAL BRANCH AND INDIRECT BRANCH TARGET PREDICTOR

BACKGROUND

In addition to caches and prefetchers, a processor may employ a branch predictor to reduce instruction execution latency. The branch predictor may be a digital circuit that tries to guess which way a branch (e.g., an if-then-else structure) will go before known definitively. Additionally, or alternatively, the branch predictor may attempt to guess whether a conditional jump will be taken or not and/or guess a target of a taken conditional or unconditional jump before the target has been computed, for example, by decoding and executing the instruction itself.

SUMMARY

According to an example embodiment, a branch predictor circuit comprises: a combined predictor table configured to store at least one tagged conditional branch prediction in combination with at least one tagged indirect branch target prediction; and prediction logic. The at least one tagged indirect branch target prediction may be configured to include a predicted partial target address of a complete target address, the complete target address associated with an indirect branch instruction of a processor. The prediction logic may be configured to use the predicted partial target address to produce a predicted complete target address of the complete target address for use by the processor prior to execution of the indirect branch instruction.

Production of the predicted complete target address may cause the processor to advance execution to the predicted complete target address to prevent stalling of instruction execution otherwise incurred due to execution of the indirect branch instruction to compute the complete target address.

The combined predictor table may be further configured to separate, on a row basis, the at least one tagged conditional branch prediction from the at least one tagged indirect branch target prediction.

The at least one tagged indirect branch target prediction may be further configured to include a source indicator specifying a location of one or more stored address bits. The prediction logic may be further configured to combine the predicted partial target address with at least a portion of the one or more stored address bits, from the location specified, to form the predicted complete target address.

The prediction logic may be further configured to construct a least significant address portion, of the predicted complete target address, from the predicted partial target address, and construct a most significant address portion, of the predicted complete target address, from the at least a portion of the one or more stored address bits, from the location specified.

The branch predictor circuit may further comprise at least one HighBits register configured to store the one or more stored address bits. The source indicator may be configured to specify the location as one of: the at least one HighBits register or a program counter of the processor.

The one or more stored address bits may correspond to one or more higher order bits of a computed target address of an executed indirect branch instruction. The computed target address may exceed a given range relative to a value of the program counter prior to execution of the executed indirect branch instruction.

The branch predictor circuit may further comprise training logic configured to write the HighBits register in the event the computed target address exceeds the given range.

The combined predictor table may be indexed via a hash of at least a portion of bits of a program counter of the processor and path information. The at least a portion of bits of the program counter may be associated with a fetched conditional or indirect branch instruction fetched by the processor.

The path information may include branch-related information, non-branch related information, or a combination thereof.

The path information may include branch-related information that represents a program path taken by the processor to arrive at the fetched conditional or indirect branch instruction.

The path information may include non-branch related information that includes instruction information, subroutine information, or a combination thereof. The instruction information and subroutine information may be associated with one or more instructions or subroutines, respectively, that are encountered by the processor along a program path taken by the processor to arrive at the fetched conditional or indirect branch instruction.

The combined predictor table may include one or more banks. Each of the one or more banks may be indexed with a different length of the path information employed in the hash.

The different length may correspond to a respective length of a series of one or more increasing lengths associated with the one or more banks. The series may approximate a geometric series.

In an event the processor fetches the indirect branch instruction, the prediction logic may be configured to: construct an index; construct a tag; and produce the predicted complete target address. The predicted complete target address may be produced from (i) the predicted partial target address of a selected tagged indirect branch prediction selected from among the at least one tagged indirect branch prediction indexed by the index, the selected tagged indirect branch prediction including a matching tag that matches the tag constructed, the matching tag associated with a longest length of path information relative to lengths of path information associated with matching tags of the at least one tagged indirect branch prediction indexed by the index or (ii) the predicted partial target address of a default selection, the default selection selected from among the at least one tagged indirect branch prediction or a default address, in an event there is a tag miss.

The branch predictor circuit may further comprise an exclusive conditional branch predictor table configured to store untagged conditional branch predictions, exclusively.

The prediction logic may be further configured to select a conditional branch prediction from among entries of the exclusive conditional branch predictor table, and the at least one tagged conditional branch instruction of the combined predictor table, to produce a predicted direction for a conditional branch instruction for use by the processor prior to execution of the conditional branch instruction.

In an event the processor fetches a conditional branch instruction, the prediction logic may be configured to: construct an index; construct a tag; and producing a conditional branch prediction for the conditional branch instruction from (i) a selected tagged conditional branch prediction selected from among the at least one tagged conditional branch prediction indexed by the index, the selected tagged conditional branch prediction including a matching tag that matches the tag constructed, the matching tag associated with a longest length of path information relative to lengths of path information associated with matching tags of the at least one tagged conditional branch prediction indexed by the index or (ii) an untagged conditional branch prediction of the exclusive conditional branch prediction table, the exclusive conditional branch prediction table indexed by a program counter of the processor, in an event there is a tag miss.

The exclusive conditional branch predictor table may be indexed via at least a portion of bits of the program counter of the processor.

The at least one tagged conditional branch prediction and the at least one tagged indirect branch target prediction may include respective tags constructed from a program counter of the processor and path information of a program path taken by the processor to arrive at a fetched conditional or indirect branch instruction, respectively.

The branch predictor circuit may further comprise training logic. The training logic may be configured to: construct the respective tags via a hash function applied to a first at least a portion of the program counter and a second at least a portion of the path information; and store the at least one tagged conditional branch prediction and the at least one tagged indirect branch target prediction in the combined predictor table.

The branch predictor circuit may further comprise training logic configured to overwrite one or more of the at least one tagged conditional branch prediction with a given tagged indirect branch target prediction.

The training logic may be further configured to overwrite the one or more of the at least one tagged conditional branch prediction as a function of a confidence indicator included in the one or more of the at least one tagged conditional branch prediction.

In an event the confidence indicator is zero, the training logic may be configured to overwrite the one or more of the at least one tagged conditional branch prediction with the given tagged indirect branch target prediction.

The training logic may be further configured to increase or decrease the confidence indicator based on whether or not the predicted direction is a misprediction.

According to another example embodiment, a method for performing branch prediction may comprise storing at least one tagged conditional branch prediction in combination with at least one tagged indirect branch target prediction in a combined predictor table, the at least one tagged indirect branch target prediction including a predicted partial target address of a complete target address, the complete target address associated with an indirect branch instruction of a processor; and using the predicted partial target address to produce a predicted complete target address of the complete target address for use by the processor prior to execution of the indirect branch instruction.

The method may further comprise causing execution of the processor to advance to the predicted complete target address to prevent stalling of instruction execution otherwise incurred due to execution of the indirect branch instruction to compute the complete target address.

The method may further comprise separating, on a row basis, the at least one tagged conditional branch prediction from the at least one tagged indirect branch target prediction in the combined predictor table.

The method may further comprise: including a source indicator specifying a location of one or more stored address bits in the at least one tagged indirect branch target prediction; and combining the predicted partial target address with at least a portion of the one or more stored address bits, from the location specified, to form the predicted complete target address.

The method may further comprise: constructing a least significant address portion, of the predicted complete target address, from the predicted partial target address; and constructing a most significant address portion, of the predicted complete target address, from the at least a portion of the one or more stored address bits, from the location specified.

The method may further comprise storing the one or more stored address bits in at least one HighBits register, the source indicator specifying the location as one of: the at least one HighBits register or a program counter of the processor. The one or more stored address bits may correspond to one or more higher order bits of a computed target address of an executed indirect branch instruction, the computed target address exceeding a given range relative to a value of the program counter prior to execution of the executed indirect branch instruction.

The method may further comprise writing the HighBits register in the event the computed target address exceeds the given range.

The method may further comprise indexing the combined predictor table via a hash of at least a portion of bits of a program counter of the processor and path information, the at least a portion of bits of the program counter associated with a fetched conditional or indirect branch instruction fetched by the processor.

The method may further comprise storing, in the path information, branch-related information, non-branch related information, or a combination thereof.

The method may further comprise storing, in the path information, branch-related information that represents a program path taken by the processor to arrive at the fetched conditional or indirect branch instruction.

The method may further comprise storing, in the path information, non-branch related information that includes instruction information, subroutine information, or a combination thereof, the instruction information and subroutine information associated with one or more instructions or subroutines, respectively, encountered by the processor along a program path taken by the processor to arrive at the fetched conditional or indirect branch instruction.

The combined predictor table may include one or more banks and the method may further comprise indexing each of the one or more banks indexed with a different length of the path information employed in the hash. The different length may correspond to a respective length of a series of one or more increasing lengths associated with the one or more banks, the series approximating a geometric series.

The method may further comprise: fetching the indirect branch instruction; constructing an index; constructing a tag; and producing the predicted complete target address. The predicted complete target address may be produced from (i) the predicted partial target address of a selected tagged indirect branch prediction selected from among the at least one tagged indirect branch prediction indexed by the index, the selected tagged indirect branch prediction including a matching tag that matches the tag constructed, the matching tag associated with a longest length of path information relative to lengths of path information associated with matching tags of the at least one tagged indirect branch prediction indexed by the index or (ii) the predicted partial target address of a default selection, the default selection selected from among the at least one tagged indirect branch prediction or a default address, in an event there is a tag miss.

The method may further comprise storing untagged conditional branch predictions, exclusively, in an exclusive conditional branch predictor table.

The method may further comprise: selecting a conditional branch prediction from among entries of the exclusive conditional branch predictor table and the at least one tagged conditional branch instruction of the combined predictor table; and producing a predicted direction for a conditional branch instruction for use by the processor prior to execution of the conditional branch instruction.

The method may further comprise: fetching a conditional branch instruction; constructing an index; constructing a tag; and producing a conditional branch prediction for the conditional branch instruction from (i) a selected tagged conditional branch prediction selected from among the at least one tagged conditional branch prediction indexed by the index, the selected tagged conditional branch prediction including a matching tag that matches the tag constructed, the matching tag associated with a longest length of path information relative to lengths of path information associated with matching tags of the at least one tagged conditional branch prediction indexed by the index or (ii) an untagged conditional branch prediction of the exclusive conditional branch prediction table, the exclusive conditional branch prediction table indexed by a program counter of the processor, in an event there is a tag miss.

The method may further comprise indexing the exclusive conditional branch predictor table via at least a portion of bits of the program counter of the processor.

The method may further comprise storing, in the at least one tagged conditional branch prediction and the at least one tagged indirect branch target prediction include respective tags constructed from a program counter of the processor and path information of a program path taken by the processor to arrive at a fetched conditional or indirect branch instruction, respectively.

The method of may further comprise: constructing the respective tags via a hash function applied to a first at least a portion of the program counter and a second at least a portion of the path information; and storing the at least one tagged conditional branch prediction and the at least one tagged indirect branch target prediction in the combined predictor table.

The method may further comprise overwriting one or more of the at least one tagged conditional branch prediction with a given tagged indirect branch target prediction.

The method may further comprise overwriting the one or more of the at least one tagged conditional branch prediction as a function of a confidence indicator included in the one or more of the at least one tagged conditional branch prediction.

The method may further comprise overwriting the one or more of the at least one tagged branch conditional prediction with the given tagged indirect branch target prediction in an event the confidence indicator is zero.

The method may further comprise increasing or decreasing the confidence indicator based on whether or not the predicted direction is a misprediction.

According to yet another example embodiment, a non-transitory computer-readable medium having encoded thereon a sequence of instructions which, when executed by a processor, may cause the processor to: store at least one tagged conditional branch prediction in combination with at least one tagged indirect branch target prediction in a combined predictor table, the at least one tagged indirect branch target prediction including a predicted partial target address of a complete target address, the complete target address associated with an indirect branch instruction of the processor; and use the predicted partial target address to produce a predicted complete target address of the complete target address for use by the processor prior to execution of the indirect branch instruction.

Additional non-transitory computer-readable medium embodiments parallel those described above in connection with the example method embodiments.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
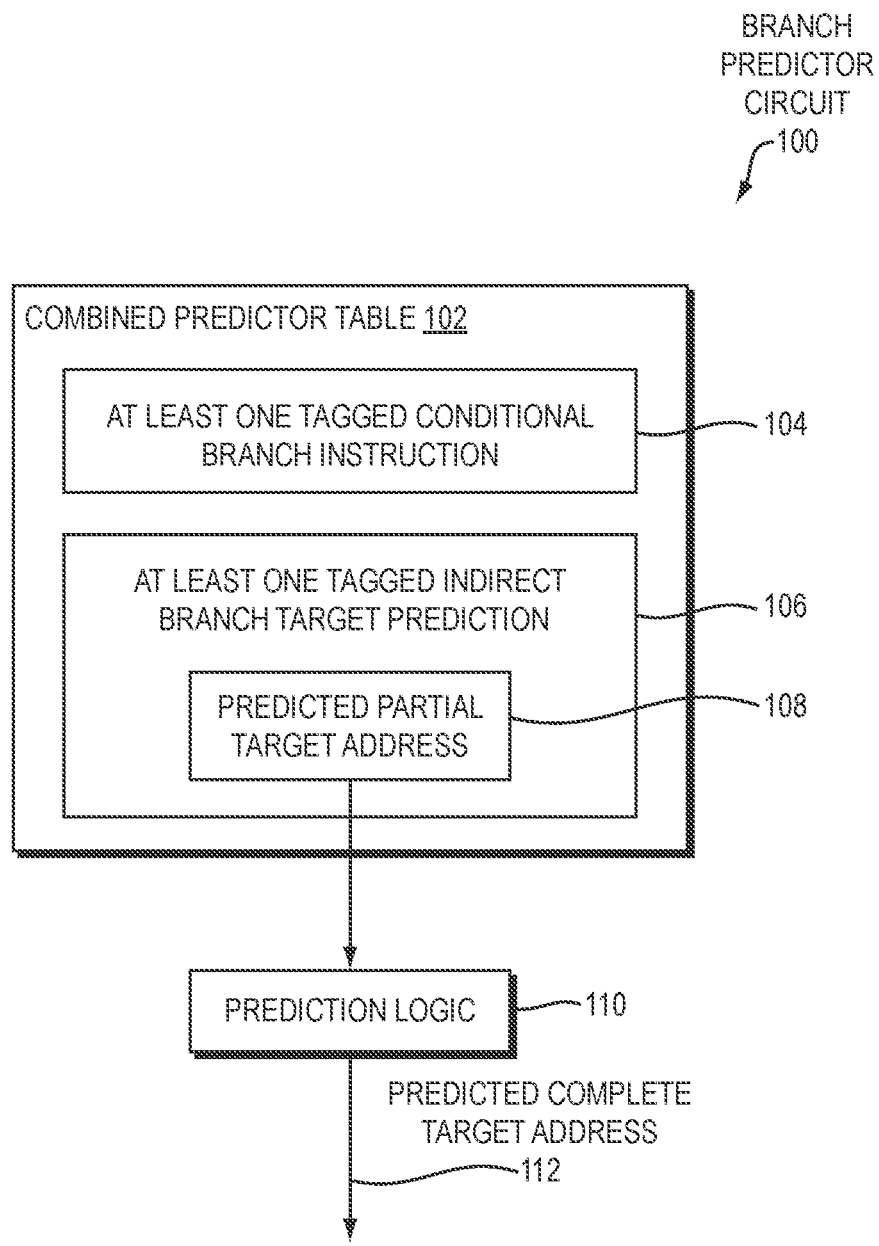
FIG. 1A is a block diagram of an example embodiment of a branch predictor circuit.

A description of example embodiments follows.

Modern processors depend on a rapid supply of instructions for performance. Such processors may employ caches, prefetchers, and predictors to improve accuracy and reduce latency. While fetching of instructions by a processor may be linear through an address space via a program counter (PC), such fetching may be altered by branches that may be conditional or unconditional. Conditional and unconditional branches may compute their target address, that is, an address of a next instruction to execute, using a combination of a current value of the PC, information from a current instruction or some other processor state, such as may be reflected by a value stored in a general-purpose register.

So-called PC-relative branches use information (e.g., an offset) from the current instruction to produce the target address and may only rely on prediction of a branch direction to continue fetching. Indirect branches may rely on other processor states to compute the target address and, therefore, may be more difficult to predict. However, all branches tend to exhibit temporal and spatial locality which may be exploited by caches and predictors. An example embodiment combines use of a branch predictor with cache-like storage of previously executed branch targets to improve performance while minimizing hardware cost.

An example embodiment of a branch predictor combines an indirect branch target prediction and a conditional branch target predictor into one combined predictor for an accurate and hardware efficient implementation. An example embodiment offers an improvement over an example architecture that combines a complete indirect target address and multiple conditional branch direction predictions on a single line with confidence bits in a combined predictor table. For example, to extend such an example architecture from a 32b architecture to a 64b architecture necessitates an increase in a storage requirement due to an increase to the indirect target address and may potentially waste valuable storage with infrequently changing most-significant bits (MSBs). Multiple example embodiments improve such an example architecture by reducing a storage requirement for indirect predictions.

For example, according to an example embodiment, target addresses are written over conditional branch predictions rather than extend table width of the combined predictor table. According to an example embodiment, a target address may be written over a pair of conditional branch predictions rather than extend table width. This results in much smaller table size and minimal performance impact of conditional predictions.

According to an example embodiment for such improvement, target predictions may store only lower bits of a full target address together with a tag, confidence bits, and a flag (also referred to interchangeably herein as a HighBits flag or source indicator) indicating when the complete target address should substitute a HighBits register value instead of a MSBs of program counter (PC) to form the complete target address. As such, predictions for long jump targets, that is, target address predictions that exceed a range, such as 1 MB or any other suitable range, need not have upper address bits consume space of the combined predictor table. Such upper address bits may change, infrequently, as disclosed above. By employing the one or more HighBits registers and the PC to set such upper address bits, a storage requirement of the combined predictor table need not be extended due to an increase in target address length based on architecture change.

According to another example embodiment for such improvement, one or more HighBits registers may be configured to save respective values after an indirect jump (i.e., branch) exceeds a range of the target prediction. The one or more HighBits registers may be configured to store respective target MSBs, which change less frequently, outside of the combined predictor table to reduce table storage requirements. Predictions with the HighBits flag set to indicate a HighBits register select the HighBits register to obtain MSGs of the target address instead of using MSBs of a current PC to complete the target prediction address.

According to another example embodiment, a conditional base predictor configured to provide default predictions for conditional branches is not used for indirect target storage because this would overwrite, for example, 16 base (i.e., default) conditional predictions, leading to lower conditional branch accuracy. As such, according to the example embodiment, the conditional base predictor may store conditional predictions, exclusively.

As such, an example embodiment of a combined conditional and indirect branch predictor may achieve high conditional branch prediction accuracy together with indirect target branch prediction capability at minimal additional hardware cost.

FIG. 1 is a block diagram of an example embodiment of a branch predictor circuit 100 that comprises: a combined predictor table 102 configured to store at least one tagged conditional branch prediction 104 in combination with at least one tagged indirect branch target prediction 106; and prediction logic 110. The at least one tagged indirect branch target prediction 106 is configured to include a predicted partial target address 108 of a complete target address (not shown) that is associated with an indirect branch instruction of a processor, such as the indirect branch instruction 242 of the processor 224 of FIG. 2, disclosed further below. The prediction logic 110 is configured to use the predicted partial target address 108 to produce a predicted complete target address 112 of the complete target address for use by the processor prior to execution of the indirect branch instruction.

Production of the predicted complete target address 112 may cause the processor to advance execution to the predicted complete target address 112 to prevent stalling of instruction execution otherwise incurred due to execution of the indirect branch instruction to compute the complete target address. According to an example embodiment, the branch predictor circuit 100 may be combined with an execution unit on single physical chip referred to as a processor. Alternatively, the branch predictor circuit may be located on a separate physical chip relative to another physical chip that includes the execution unit and is referred to as the processor.

The combined predictor table 102 may be further configured to separate, on a row basis, the at least one tagged conditional branch prediction 104 from the at least one tagged indirect branch target prediction 106.

Figure 1B:
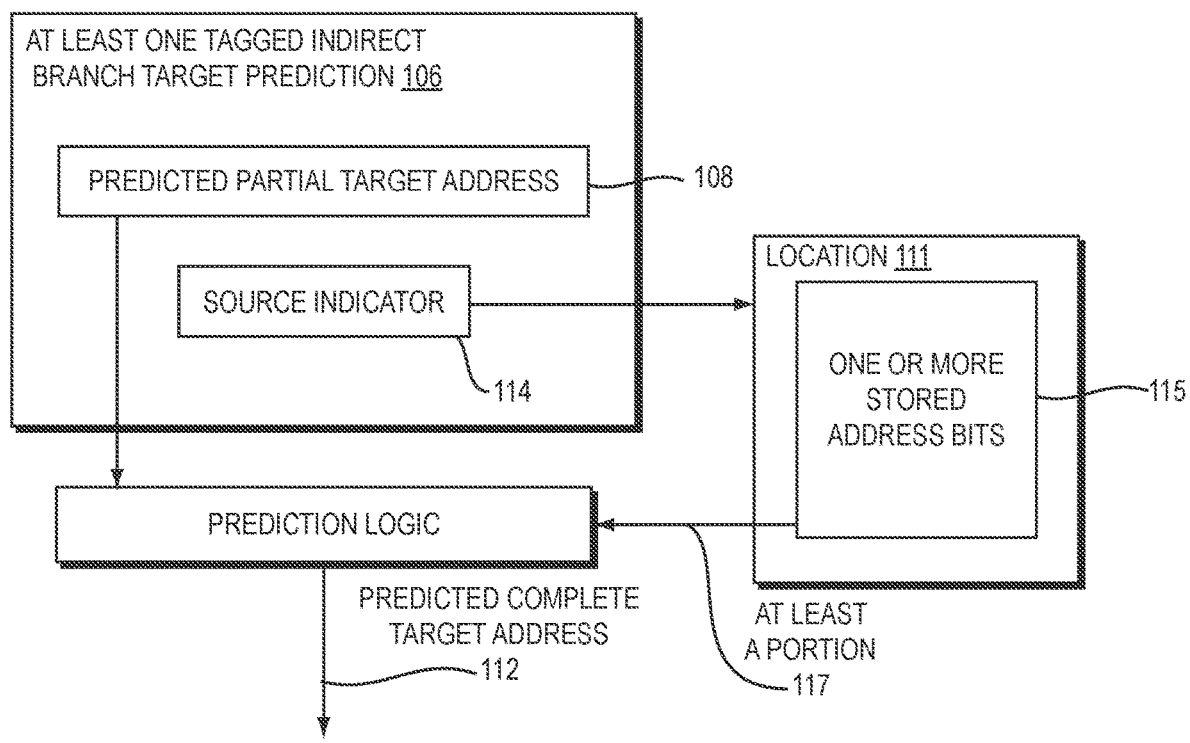
FIG. 1B is a block diagram of an example embodiment of at least one tagged indirect branch target prediction.

FIG. 1B is a block diagram of an example embodiment of at least one tagged indirect branch target prediction 106. In addition to the predicted partial target address 108, the at least one tagged indirect branch target prediction 106 is further configured to include a source indicator 114 specifying a location 111 of one or more stored address bits 115. The prediction logic 110 may be further configured to combine the predicted partial target address 108 with at least a portion 117 of the one or more stored address bits 115, from the location 111 specified, to form the predicted complete target address 112.

Figure 1C:
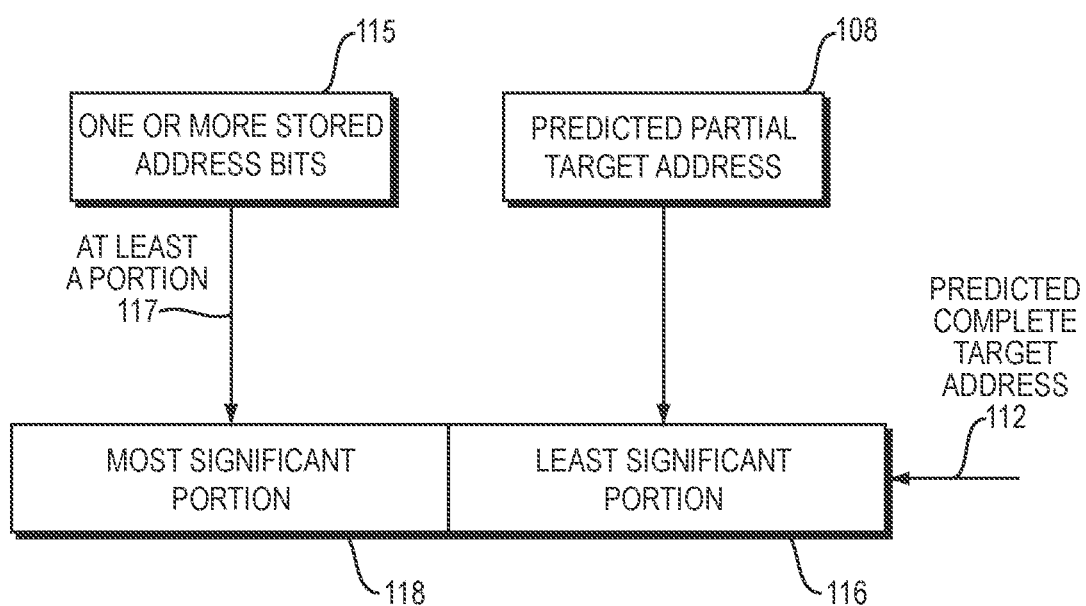
FIG. 1C is a block diagram of an example embodiment of a predicted complete target address.

FIG. 1C is a block diagram of an example embodiment of the predicted complete target address 112. According to an example embodiment, the prediction logic 110 may be further configured to construct a least significant address portion 116 of the predicted complete target address 112 from the predicted partial target address 108, and construct a most significant address portion 118 of the predicted complete target address 112 from the at least a portion 117 of the one or more stored address bits 115 from the location 111 specified.

Figure 2:
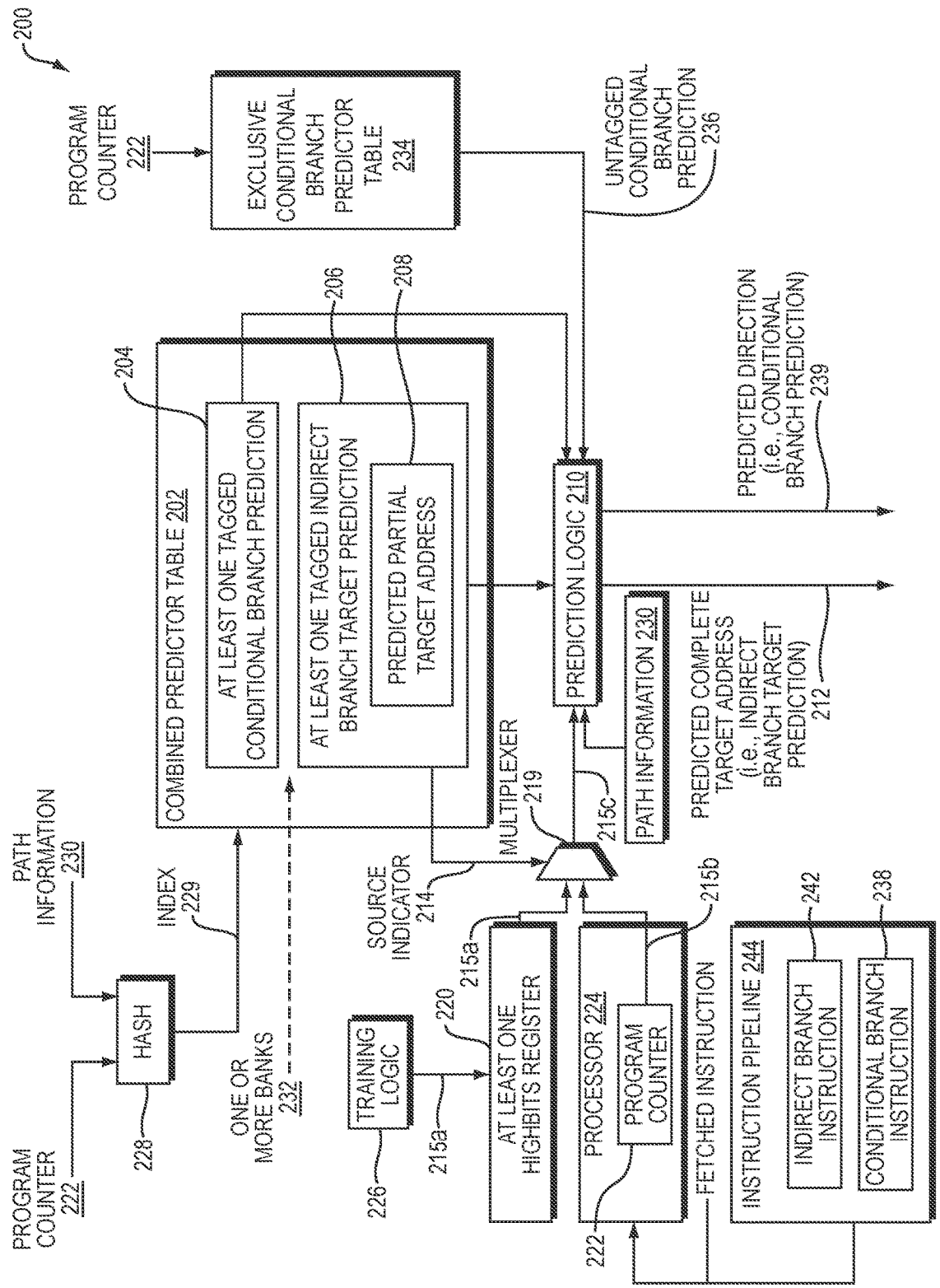
FIG. 2 is a block diagram of another example embodiment of a branch predictor circuit.

FIG. 2 is a block diagram of another example embodiment of a branch predictor circuit 200 that comprises: a combined predictor table 202 configured to store at least one tagged conditional branch prediction 204 in combination with at least one tagged indirect branch target prediction 206; and prediction logic 210. The at least one tagged indirect branch target prediction 206 is configured to include a predicted partial target address 208 of a complete target address (not shown) that is associated with an indirect branch instruction (not shown) of a processor 224. The prediction logic 210 is configured to use the predicted partial target address 208 to produce a predicted complete target address 212 of the complete target address for use by the processor 224 prior to execution of the indirect branch instruction. The branch predictor circuit 200 further comprises at least one HighBits register 220.

The at least one HighBits register 220 may be configured to store the one or more stored address bits 115, disclosed above with regard to FIG. 1B. According to an example embodiment, the source indicator 114 of FIG. 1B may be configured to specify the location 111 as one of: the at least one HighBits register 220 or a program counter 222 of the processor 224. For example, the at least one HighBits register 220 may store a first set of one or more stored address bits 215a and the program counter 222 may store a second set of one or more stored address bits 215b. The branch predictor circuit 200 may include a multiplexer 219. A source indicator 214 of the at least one tagged indirect branch target prediction 208 may be employed to drive the multiplexer 219 to select the one or more stored address bits 215c to be sourced by one of either the at least one HighBits register 220 or the program counter 222. It should be understood that selection of the location, such as the location 111 of FIG. 1B, disclosed above, may be performed in any suitable way and that the multiplexer 219 is an example of hardware logic that may be used to perform such a selection and implementation is not limited thereto.

The source indicator 214 may include one or more selector bits. A number of the one or more selector bits may be a function of how many HighBits registers are employed in the branch predictor circuit 200. For example, in an event a single HighBits register is employed, the number may be one and the source indicator may reflect one of two values for selecting the location 111 to be either the single HighBits register or the program counter 222. However, in an event that multiple HighBits registers are employed as the at least one HighBits register 220, the number may be greater than one.

According to an example embodiment, the one or more stored address bits 215b of the program counter 222 may correspond to one or more higher order bits of a computed target address (not shown) of an executed indirect branch instruction (not shown), the computed target address exceeding a given range, such as 1 Mbyte, 2 Mbyte, or any other suitable given range, relative to a value of the program counter 222 prior to execution of the executed indirect branch instruction. The branch predictor circuit 200 may further comprise training logic 226 configured to write the at least one HighBits register 220 in the event the computed target address exceeds the given range.

According to an example embodiment, the combined predictor table 202 may be indexed via a hash 228 of at least a portion of bits of a program counter 222 of the processor 224 and path information 230. The at least a portion of bits of the program counter 222 may be associated with a fetched conditional or indirect branch instruction fetched by the processor 224. The path information 230 may include branch-related information (not shown), non-branch related information (not shown), or a combination thereof. For example, the path information 230 may include branch-related information that represents a program path taken by the processor 224 to arrive at the fetched conditional or indirect branch instruction. The path information 230 may be stored in any suitable way.

According to an example embodiment, the branch predictor circuit 200 may further comprise a shift register (not shown) and the path information 230 may be stored in the shift register. The path information 230 may be updated, speculatively, and restored to a known value on misprediction. Such restoration may be performed in any suitable manner. For example, the path information may be stored in a circular buffer and restoration may be performed by updating a circular pointer. For example, such restoration may include restoring a head pointer of a circular buffer that stores the path information 230.

The path information 230 may include of a series of Taken/Not bits from past conditional branches. According to an example embodiment, long strings of Not Taken bits may be prevented from diluting the information content. The path information 230 may include microarchitectural details such as whether subroutine call or return was encountered in a path, or other information about the instructions (e.g., type, quantity, data, etc.) that were encountered along the path prior to a branch.

The path information 230 may include non-branch related information that includes instruction information (not shown), subroutine information (not shown), or a combination thereof. The instruction information and subroutine information may be associated with one or more instructions or subroutines, respectively, that are encountered by the processor 224 along a program path (not shown) taken by the processor 224 to arrive at the fetched conditional or indirect branch instruction.

According to an example embodiment, the combined predictor table 202 may include one or more banks 232. Each of the one or more banks 232 may be indexed with a different length (not shown) of the path information 230 employed in the hash 228.

The different length may correspond to a respective length of a series of one or more increasing lengths (not shown) associated with the one or more banks 232. The series may approximate a geometric series.

In an event the processor 224 fetches the indirect branch instruction 242, for example, from an instruction pipeline 244, the prediction logic 210 may be configured to: construct an index 229; construct a tag (not shown); and produce the predicted complete target address 212. The predicted complete target address 212 may be produced from (i) the predicted partial target address 208 of a selected tagged indirect branch prediction (not shown) that is selected from among the at least one tagged indirect branch prediction 206 indexed by the index 229, the selected tagged indirect branch prediction including a matching tag (not shown) that matches the tag constructed, the matching tag associated with a longest length of the path information 230 relative to lengths of the path information 230 that are associated with matching tags of the at least one tagged indirect branch prediction 206 that are indexed by the index 229 or (ii) the predicted partial target address of a default selection (not shown), the default selection selected from among the at least one tagged indirect branch prediction 206 or a default address, in an event there is a tag miss.

According to an example embodiment, the branch predictor circuit 200 may further comprise an exclusive conditional branch predictor table 234 configured to store untagged conditional branch predictions, exclusively.

The prediction logic 210 may be further configured to select a conditional branch prediction for a conditional branch instruction 238 from among entries of the exclusive conditional branch predictor table 234, and the at least one tagged conditional branch instruction 204 of the combined predictor table 202, to produce a predicted direction 239 for use by the processor 224 prior to execution of the conditional branch instruction 238.

In an event the processor 224 fetches the conditional branch instruction 238, the prediction logic 210 may be configured to: construct an index 229; construct a tag (not shown); and produce a conditional branch prediction, that is, the predicted direction 239 for the conditional branch instruction 238, from (i) a selected tagged conditional branch prediction (not shown) selected from among the at least one tagged conditional branch prediction 204 indexed by the index, the selected tagged conditional branch prediction (not shown) including a matching tag (not shown) that matches the tag constructed, the matching tag associated with a longest length of the path information 230 relative to lengths of the path information 239 associated with matching tags of the at least one tagged conditional branch prediction 204 indexed by the index 229 or (ii) an untagged conditional branch prediction 236 of the exclusive conditional branch prediction table 234, the exclusive conditional branch prediction table 234 indexed by the program counter 222 of the processor 224, in an event there is a tag miss.

The exclusive conditional branch predictor table 234 may be indexed via at least a portion of bits of the program counter 222 of the processor 224.

The at least one tagged conditional branch prediction 204 and the at least one tagged indirect branch target prediction 206 may include respective tags (not shown) constructed from the program counter 222 of the processor 224 and the path information 230 of a program path (not shown) taken by the processor 224 to arrive at a fetched conditional or indirect branch instruction, respectively, such as the conditional branch instruction 238 or the indirect branch instruction 242 that may be fetched by the processor 224 from the instruction pipeline 244.

According to an example embodiment, the training logic 226 may be configured to: construct the respective tags via a hash function applied to a first at least a portion of the program counter 222 and a second at least a portion of the path information 230; and store the at least one tagged conditional branch prediction 204 and the at least one tagged indirect branch target prediction 206 in the combined predictor table 202. The hash function applied for generating the respective tags may be a same or different hash function from the hash 228 applied to generate the index 229.

According to an example embodiment, training logic 226 may be configured to overwrite one or more of the at least one tagged conditional branch prediction 204 with a given tagged indirect branch target prediction (not shown). Since a number of indirect branch instructions may be few in comparison to conditional branch instructions, rows of the combined predictor table 202 may be dedicated to storing either conditional branch predictions or indirect branch target predictions. It should be understood that any given row of the combined predictor table 202 may store multiple tagged conditional branch predictions or multiple tagged indirect branch target predictions.

To reduce a storage requirement for the combined predictor table 202, an example embodiment enables one or more tagged indirect branch target predictions to be written over one or more tagged conditional branch predictions. According to an example embodiment, tagged indirect branch target predictions and tagged conditional branch predictions are stored in separate rows (i.e., lines) of the combined predictor table 202, thus, are separated on a row basis. As such, a table width of the combined predictor table 202 need not be extended due to an architecture change that relies on a larger target address for indirect branch instructions relative to a current architecture. A small table size may be implemented for the combined predictor table 202 relative to storing tagged conditional branch predictions and tagged indirect branch target predictions on a same line, and performance of conditional branch predictions may be impacted, minimally, since indirect branch instructions may be fetched at much lower frequency relative to conditional branch instructions.

According to an example embodiment, the training logic 226 may be further configured to overwrite the one or more of the at least one tagged conditional branch prediction 204 as a function of a confidence indicator (not shown) included in the one or more of the at least one tagged conditional branch prediction 204. In an event the confidence indicator is zero, the training logic 226 may be configured to overwrite the one or more of the at least one tagged conditional branch prediction 204 with the given tagged indirect branch target prediction. The training logic 226 may be further configured to increase or decrease the confidence indicator based on whether or not the predicted direction 239 is a misprediction.

Figure 3A:
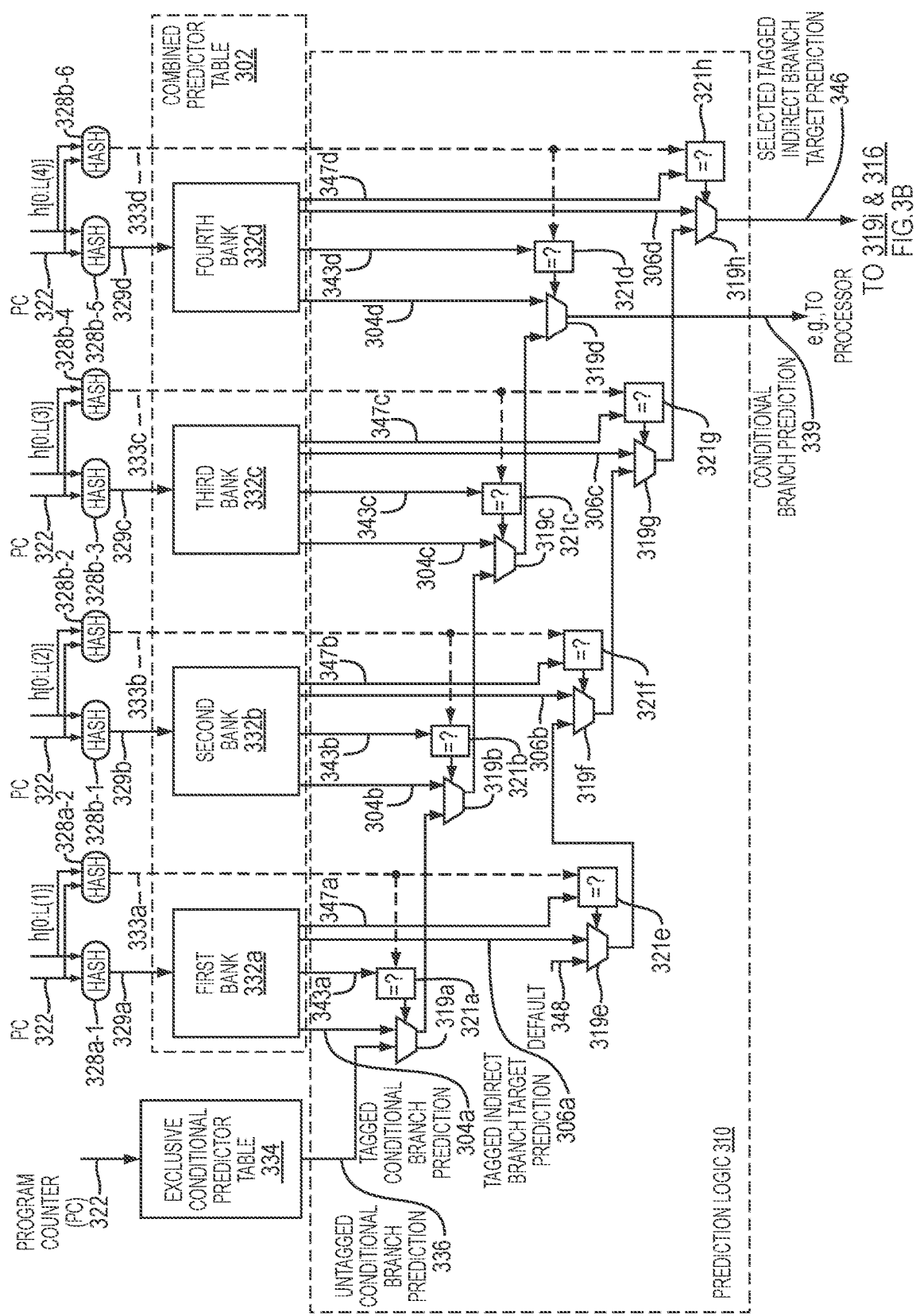
FIG. 3A is a block diagram of another example embodiment of a branch predictor circuit.

FIG. 3A is a block diagram of another example embodiment of a branch predictor circuit 300. The branch predictor circuit 300 comprises an exclusive conditional branch predictor table 334 configured to store untagged conditional branch predictions, exclusively, a combined predictor table 302 configured to store at least one tagged conditional branch prediction (not shown) in combination with at least one tagged indirect branch target prediction (not shown); and prediction logic 310.

According to the example embodiment, the combined predictor table 302 includes a first bank 332a, second bank 332b, third bank 332c, and fourth bank 332d. It should be understood that a number of banks (i.e., tables or arrays) included in the example embodiment is for illustrative purposes and that any number of one or more banks may be employed by the combined predictor table 302. Such banks may be referred to interchangeably herein as tables or arrays, and may be located in separate memories or a same memory. Each of the banks 332a-d may be indexed with a respective index constructed using a different length of path information h employed in a hash. For example, the first bank 332a, second bank 332b, third bank 332c, and fourth bank 332d may be indexed by the indices 329a-d, respectively. The indices 329a, 329b, 329c, and 329d may be constructed using the hash functions 328a-1, 328b-1, 328c-1, and 328d-1, respectively. Such hash functions may be a same or different hash functions.

Each of the hash functions 328a-1, 328b-1, 328c-1, and 328d-1 may be configured to hash one or more bits of the program counter 322 with a respective length of the path information h. For example, the hash functions 328a-1, 328b-1, 328c-1, and 328d-1 may be configured to hash the one or more bits of the program counter 322 with bits 0:L(1), 0:L(2), 0:L(3), and 0:L(4) of h, respectively, where L(1), L(2), L(3) and L(4) are different lengths. The different lengths may correspond to respective lengths of a series of one or more increasing lengths and the series may approximate a geometric series.

The different lengths L of the path information are integers. Using an approximate geometric series allows very long lengths to be used for indexing some banks (also referred to interchangeably herein as predictor tables or predictor components), while still dedicating most of the storage space to predictor tables using short history lengths. Based on a number of the one or more banks of the combined predictor table 302 being i, L may be of the form $L(1)=\alpha^{i-1}*L(i)$, i.e., the lengths L(i) form a geometric series. As an example on an 8-component predictor, using $\alpha=2$ and L(1)=2 leads to the following series (0,2,4,8,16,32,64,128). According to the example embodiment, the series may approximate a geometric series.

The branch predictor circuit 300 further includes the hash functions 328a-2, 328b-2, 328c-2, and 328d-2 for constructing tags 332a-d for matching against tags of entries indexed by the indices 329a-d, respectively. The prediction logic 310 includes comparators 321a-h for comparing the constructed tags 333a-d and further includes multiplexers 319a-h that are controlled via outputs of the comparators 321a-h, respectively. It should be understood that additional multiplexers for selecting a matching tagged entry at the first bank 332a, second bank 332b, third bank 332c, and fourth bank 332d have been omitted for simplicity.

In an event a processor, such as the processor 224 of FIG. 2, disclosed above, fetches a conditional branch instruction, such as the conditional branch instruction 238 of FIG. 2, each of the exclusive conditional predictor table 334 and the one or more banks of the combined predictor table 302, that is, the first bank 332a, second bank 332b, third bank 332c, and fourth bank 332d, in the example embodiment, may be accessed simultaneously. The exclusive conditional predictor table 334 may be a PC-indexed table and an untagged conditional branch prediction 336 may be retrieved from the exclusive conditional predictor table 334 using the program counter 322.

The first bank 332a, second bank 332b, third bank 332c, and fourth bank 332d may be indexed via their respective indices, namely, 329a, 329b, 329c, and 329d, that may be constructed using the hash functions 328a-1, 328b-1, 328c-1, and 328d-1, respectively, as disclosed above, to retrieve the tagged conditional branch predictions 304a, 304b, 304c, and 304d, respectively. It should be understood that each of the tagged conditional branch predictions 304a, 304b, 304c, and 304d may include a single tagged conditional branch prediction or multiple tagged conditional branch predictions. For example, an index of the indices 329a-d may access one or more tagged conditional branch predictions. The comparators 321a-d may be employed to compare the constructed tags 333a-d with conditional branch tags 343a-d of the retrieved tagged conditional branch predictions 304a, 304b, 304c, and 304d, respectively. Outputs of the comparators 321a-d may be used to drive outputs of the multiplexers 319a-d, respectively, to produce a conditional branch prediction 339.

As such, the prediction logic 310 selects the conditional branch prediction 339 for a conditional branch instruction from among entries of the exclusive conditional branch predictor table 334 and tagged conditional branch instructions 304a-d of the combined predictor table 302, to produce the conditional branch prediction 339 that may be a predicted direction for use by the processor prior to execution of the conditional branch instruction.

According to the example embodiment, the predicted direction, that is, the conditional branch prediction 339, may be produced for a conditional branch instruction from (i) a selected tagged conditional branch prediction selected from among the at least one tagged conditional branch prediction, namely the tagged conditional branch predictions 304a-d, indexed by the indices 329a-d, the selected tagged conditional branch prediction may include a matching tag, such as 343-d, if matched to the tag constructed, namely, the constructed tags 333a-d, provided the matching tag is associated with a longest length of the path information relative to lengths L(1), L(2), L(3), and L(4) of the path information h or (ii) the untagged conditional branch prediction 336 of the exclusive conditional branch predictor table 334, indexed by the program counter 322, in an event there is a tag miss of the tagged conditional branch instructions 304a-d indexed by the indices 329a-d, respectively.

As such, conditional branch prediction of the branch predictor circuit 300 may rely on a tagless default predictor, that is, the exclusive conditional predictor table 334, backed with a plurality of tagged predictor components indexed using different lengths of path information for index computation, that is, the first bank 332a, second bank 332b, third bank 332c, and fourth bank 332d. The different lengths form an approximate geometric series. The prediction is provided either by a tag match on a tagged predictor component or by the default predictor. In case of multiple hits, the prediction is provided by the tag matching table (i.e., bank) with the longest path information. The exclusive conditional predictor table 334 may be referred to interchangeably herein as a conditional base predictor and may be a simple PC-indexed 2-bit counter bimodal table. A tagged conditional branch prediction entry in a tagged component, that is, any of the first bank 332a, second bank 332b, third bank 332c, and fourth bank 332d, may include a signed counter ctr which sign provides the prediction, a tag, and an unsigned useful counter u. According to an example embodiment, the useful counter u may be a 2-bit counter and the ctr may be a 3-bit counter; however, such counters may be of any suitable size. The useful counter u may be referred to interchangeably herein as a confidence indicator.

As disclosed above, at prediction time for a conditional branch, the conditional base predictor, that is, the exclusive conditional predictor table 334, and tagged components, that is, the first bank 332a, second bank 332b, third bank 332c, and fourth bank 332d, may be accessed simultaneously. The base predictor provides a default prediction. The tagged components provide a prediction only on a tag match. The overall conditional branch prediction is provided by the hitting tagged predictor component that uses the longest path information. In case of no matching tagged predictor component, the default prediction is used. A component that ultimately provides the prediction may be referred to herein as the provider component. A component that would have provided the prediction had there been a miss on the provider component may be referred to interchangeably herein as an alternate provider.

According to an example embodiment, the branch predictor circuit 300 may be updated at commit time. On a correct prediction, the prediction counter ctr and the useful counter u of the matching component may be updated, that is, a single predictor component may be accessed. On a misprediction, a new entry may be allocated in a tagged component. Therefore, a prediction can potentially induce up to three accesses to the predictor on a misprediction, i.e., read of all predictor tables at prediction time, read of all predictor tables at commit time, and write of (at most) two predictor tables at update time. However, the read at commit time may be avoided. Information available at prediction time, such as the number of the providing component, ctr, and nullity of all the u counters, may be checkpointed. The predictor can, therefore, be implemented using dual-ported predictor tables. However, most updates on correct predictions concern already saturated counters and may be avoided through checkpointing against saturated values. Since at most two predictor components may be updated at commit time, using 2 or 4-bank structure for the predictor tables may be a cost-effective alternative to the use of dual-ported predictor tables.

There is a tradeoff regarding a width of the tag. Using a large tag width leads to wasted part of the storage while using a too small tag width leads to false tag match detections. A false tag match detection may result in a misprediction that may trigger a new entry allocation. This new entry allocation may eject some useful prediction, etc. It should be understood that a width of a tag may be different for each table and may increase with the path information length. According to an example embodiment, tag computation may be performed during index computation and table read. Tag match computations may be performed in parallel on the tags flowing out from the tagged components.

In an event the processor fetches an indirect branch instruction, such as the indirect branch instruction 242 of FIG. 2, disclosed above, each of the one or more banks of the combined predictor table 302, that is, the first bank 332a, second bank 332b, third bank 332c, and fourth bank 332d, in the example embodiment, may be accessed simultaneously.

The first bank 332a, second bank 332b, third bank 332c, and fourth bank 332d may be indexed via their respective indices, namely, 329a, 329b, 329c, and 329d that may be constructed using the hash functions 328a-1, 328b-1, 328c-1, and 328d-1, respectively, to retrieve the tagged indirect branch target predictions 306a, 306b, 306c, and 306d, respectively. It should be understood that each of the tagged indirect branch target predictions 306a-d may include a single tagged indirect branch target prediction or multiple tagged indirect branch target predictions. For example, an index of the indices 329a-d may access one or more tagged indirect branch target predictions. The comparators 321e-h may be employed to compare the constructed tags 333a-d with indirect branch target tags 347a-d of the retrieved tagged indirect branch target predictions 306a-d, respectively. Outputs of the comparators 321e-h may be used to drive outputs of the multiplexers 319e-h, respectively, to produce a selected tagged indirect branch target prediction 346.

Figure 3B:
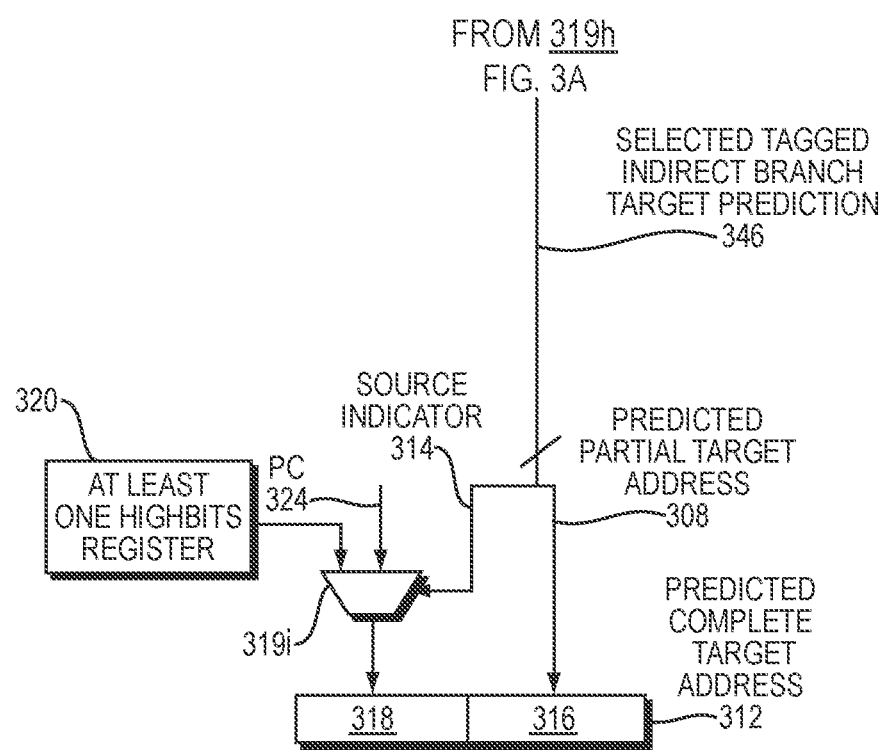
FIG. 3B is a continuation block diagram of the example embodiment of the branch predictor circuit of FIG. 3A.

FIG. 3B is a continuation block diagram of the example embodiment of the branch predictor circuit of FIG. 3A. The predicted complete target address 312 may be produced from (i) the predicted partial target address 308 of the selected tagged indirect branch prediction 346 that may be selected from among the tagged indirect branch predictions 306a-d indexed by the indices 329a-d, respectively, in an event the selected tagged indirect branch prediction 346 includes a matching tag associated with a longest length of the path information h relative to lengths of the path information h that are associated with matching tags of the tagged indirect branch predictions 306a-d indexed by the indices 329a-d, respectively, or (ii) the predicted partial target address of a default 348, the default 348 selected from among the tagged indirect branch predictions 306a-d indexed by the indices 329a-d, respectively, or a default address, in an event there is a tag miss. According to an example embodiment, the default address may be zero or a random address. According to another example embodiment, the default 348 may be selected from the first bank 332a, that is, a bank associated with a shortest length of the path information h.

The selected tagged indirect branch target prediction 346 is configured to include a predicted partial target address 308 of a complete target address (not shown) that is associated with the indirect branch instruction. The prediction logic 310 is configured to use the predicted partial target address 308 to produce a predicted complete target address 312 of the complete target address for use by the processor prior to execution of the indirect branch instruction. The branch predictor circuit 300 further comprises at least one HighBits register 320 and a multiplexor 319i.

The at least one HighBits register 320 may be configured to store one or more stored address bits, such as the one or more address bits 115 of FIG. 1B, disclosed above. According to an example embodiment, the source indicator 314 of the selected tagged indirect branch target prediction 346 may be configured to specify a location of a most significant address portion 318 of the predicted complete target address as one of: the at least one HighBits register 320 or the program counter 322.

For example, the at least one HighBits register 320 may store a first set of one or more stored address bits and the program counter 222 may store a second set of one or more stored address bits. The source indicator 314 of the selected tagged indirect branch target prediction 346 may be employed to drive the multiplexer 319i to select the one or more stored address bits to be sourced by one of either the at least one HighBits register 320 or the program counter 322.

The prediction logic 310 may be further configured to construct a least significant address portion 316, of the predicted complete target address 312, from the predicted partial target address 308, and construct a most significant address portion 318, of the predicted complete target address 312, from the at least a portion of the one or more stored address bits output by the multiplexer 319i.

As disclosed above, each bank (i.e., predictor component) of the combined predictor table 302 may indexed with a hash function of the path information h and the PC 322. According to an example embodiment, false prediction may be controlled by a confidence bit. An entry of the combined predictor table 302 may include a tag, partial target address prediction of a complete target address (i.e., jump target), confidence bit, and a useful counter, such as a 2-bit useful counter or any other suitably sized useful counter. An indirect branch target misprediction and a conditional branch misprediction may result in equivalent penalties since both mispredictions are resolved at branch execution time.

According to an example embodiment, tag and index generation logic may be shared. Conditional branch predictions and indirect branch target predictions (also referred to interchangeably herein as indirect jump predictions) may be read on different rows. For example, a row in the combined predictor table 302 stores either one or more indirect jump predictions or one or more conditional branch predictions. The branch predictor circuit 300 is a cost-effective solution when one considers a cost of implementing both a conditional predictor and an indirect jump predictor.

As disclosed above, the branch predictor circuit 300 may rely on a plurality of tagged predictor components (i.e., banks) indexed using different lengths of path information for index computation. The different lengths may form an approximate geometric series. In case of multiple hits, a prediction may be based on a predicted partial target address given by an entry of the combined predictor table 302 that resides in a bank with the longest path information.

Figure 4:
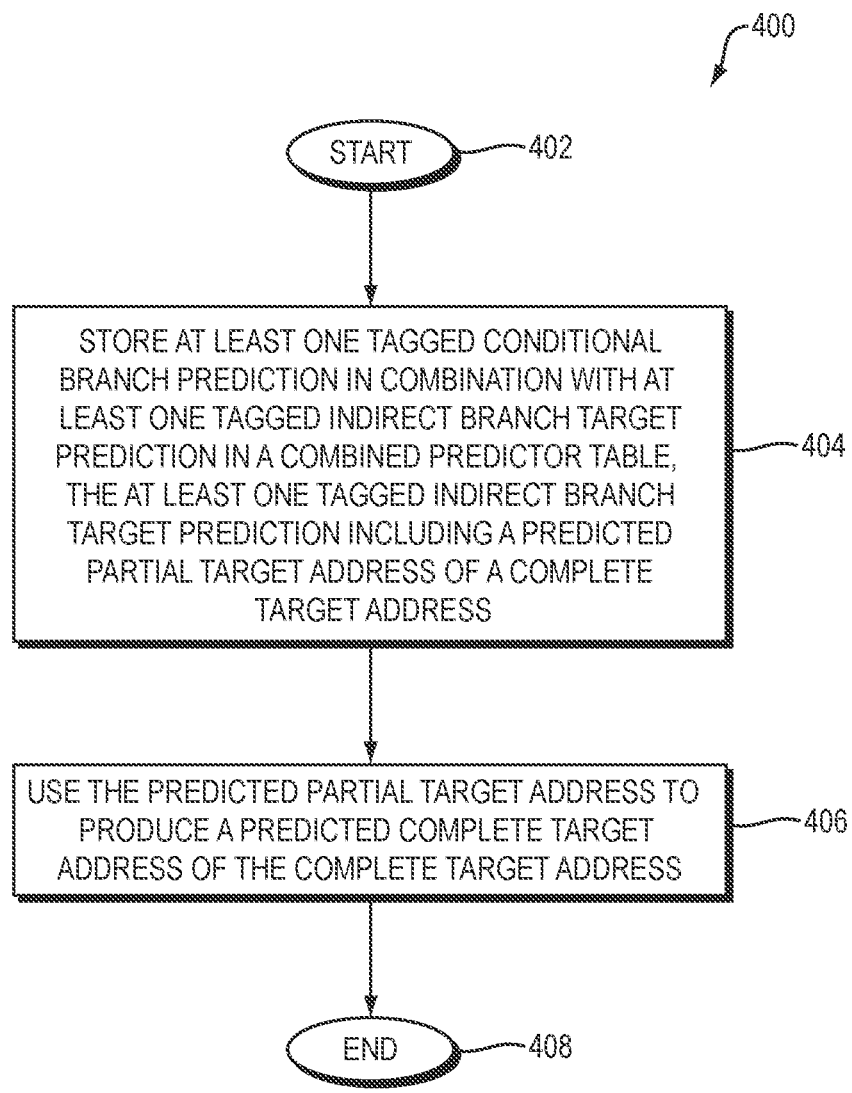
FIG. 4 is a flow diagram of an example embodiment of a method for performing branch prediction.

FIG. 4 is a flow diagram 400 of an example embodiment of a method for performing branch prediction. The method begins (402) and stores at least one tagged conditional branch prediction in combination with at least one tagged indirect branch target prediction in a combined predictor table, the at least one tagged indirect branch target prediction including a predicted partial target address of a complete target address, the complete target address associated with an indirect branch instruction of a processor (404). The method uses the predicted partial target address to produce a predicted complete target address of the complete target address for use by the processor prior to execution of the indirect branch instruction (406), and the method thereafter ends (408) in the example embodiment.

Figure 5:
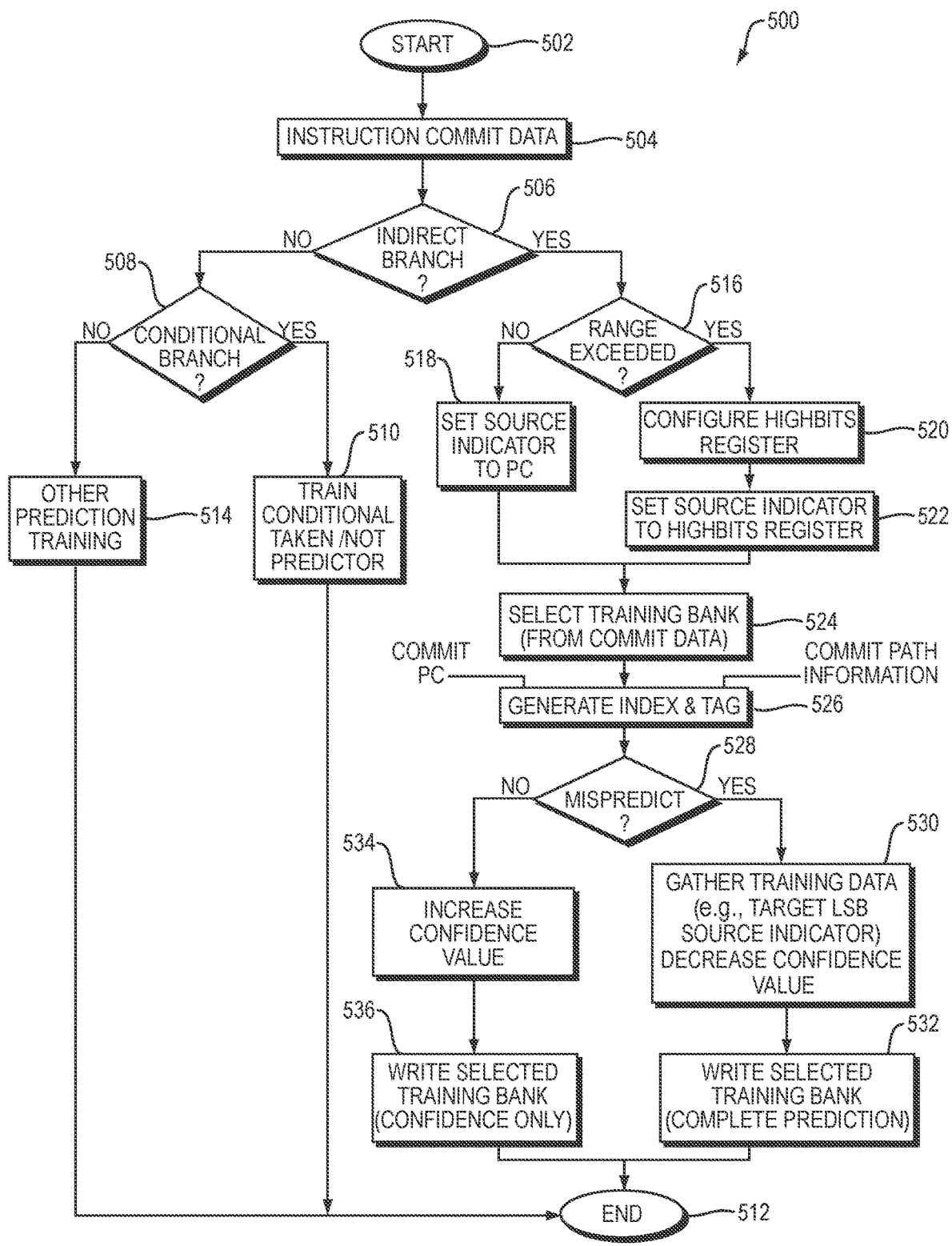
FIG. 5 is a flow diagram of an example embodiment of a method for training an indirect branch prediction.

FIG. 5 is a flow diagram 500 of an example embodiment of a method for training an indirect branch prediction. The method begins (502) and receives instruction commit data (504). The method may check for whether an instruction associated with the instruction commit data is an indirect branch target instruction (506). If not, the method may check whether an instruction associated with the instruction commit data is a conditional branch instruction (508). If the instruction associated with the instruction commit data is a conditional branch instruction, the method may train a conditional taken/not taken predictor (510), and the method thereafter ends (512) in the example embodiment. If, however, the instruction commit data is not a conditional branch instruction, the method may perform other prediction training (514), and the method thereafter ends (512) in the example embodiment.

However, if at (506) it is determined that the instruction associated with the instruction commit data is an indirect branch target instruction, the method may check whether a computed target address associated with the indirect branch target instruction exceeds a range, such as a target distance greater than 1 MB, 2 MB, or any other suitable range relative to a program counter (516). If the range is not exceeded, the method may set a source indicator for a tagged indirect branch target prediction to indicate the program counter (PC) as the location for retrieving a most signification portion of the predicted complete target address (518). However, if the range is exceeded, the method may configure at least one HighBits register to store most significant bits from the computed target address (520) and set the source indicator for the tagged indirect branch target prediction to indicate the at least one HighBits register as the location for retrieving the most signification portion of the predicted complete target address (522).

Following setting the source indicator at (518) or (522), the method may select a bank of a combined predictor table for training from the instruction commit data (524) and generate an index and tag for the trained entry (526). The method may check whether the trained entry was a misprediction (528). If yes, the method may gather training data, such as a least significant portion of the target address, source indicator, and may decrease a confidence indicator or set it to a low value (530), write the selected training bank with a complete prediction (532) and the method thereafter ends (512) in the example embodiment. If, however, it is determined at (528) that the prediction was correct, the method may increase the confidence indicator (534) and write the selected training bank to update the confidence value (536) and the method thereafter ends (512) in the example embodiment.

As instructions complete execution and are retired, predictors can be trained with the true and final execution information. In the case of indirect branches, this may include execution information (PC, branch target, whether the branch mispredicted or not), as well as information used to produce the predicted target address, such as path information, and information used in predictor maintenance (providing array/table, confidence or prediction usage indicators).

If a branch is predicted correctly, a confidence or usage counter may be incremented for the entry at the index determined by the PC and path information, in the table that provided the prediction. This serves to protect a useful prediction from early replacement if aging of entries is implemented.

If a branch is predicted incorrectly, it may be useful to store the new target so it can be used for a next prediction. Since every branch can use a prediction location in each of the combined prediction tables, a training decision may involve whether and which table to write. A prediction may only be stored in a location that contains an unused, or less useful prediction indicated by a usage count of zero. If one or more entries contain usage counts of zero, then the one associated with the lowest amount of path information may be chosen. If no entries contain usage counts of zero, then usage counts may be decremented, or aged to free an entry. There are multiple ways to age prediction entries including randomly decrementing entries, but some aging may be useful to free entries for new predictions.

Figure 6:
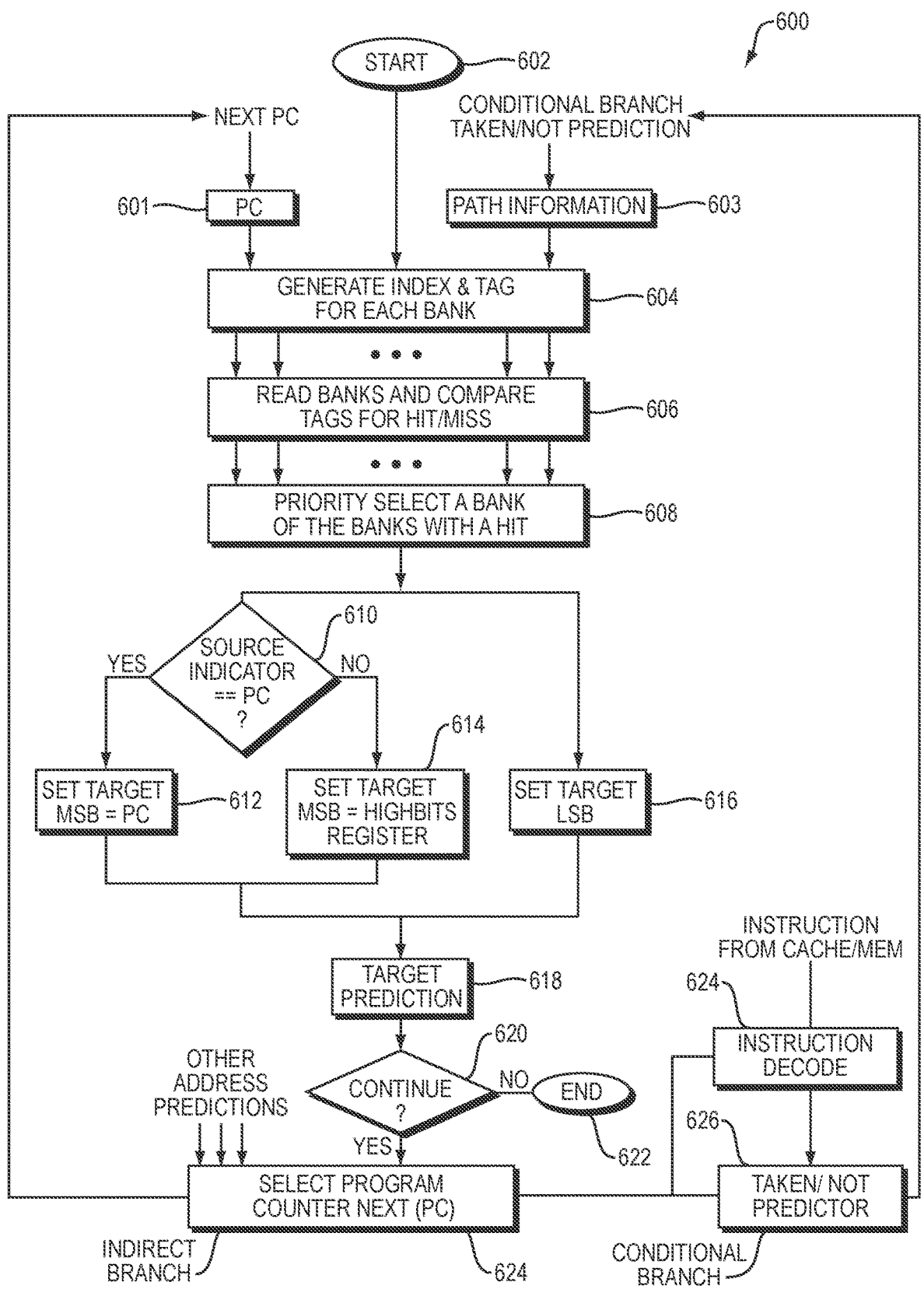
FIG. 6 is a flow diagram of an example embodiment of a method for fetching and predicting indirect and conditional branches.

FIG. 6 is a flow diagram 600 of an example embodiment of a method for fetching and predicting indirect and conditional branches. A program counter may be populated with a next program counter (601), path information may be updated with conditional branch taken/not taken predictions, and the method may begin (602) and generate an index and tag for each bank of a combined predictor table (604). The index and tag may be generated using a program counter and path information. The method may read banks of the combined predictor table and compare tags of entries indexed with the tags generated to determine hit/miss (606). The method may priority select a bank of the banks with a hit to select a tagged indirect branch target prediction (608). The method may check a source indicator of the tagged indirect branch target prediction selected for whether the source indicator indicates that a most significant portion of a predicted complete target address is to be sourced by the program counter (610).

If yes, the method may set the most significant portion of a predicted complete target address with a value of the program counter (612). If no, the method may set the most significant portion to be a value stored in at least one HighBits register identified by the source indicator (614). The method may further set a least significant portion of the predicted complete target address with the predicted partial target address stored in the tagged indirect branch target prediction selected (616) and the method may produce the target prediction, that is, the predicted complete target address (618). The method may check whether to continue (620). If not, the method thereafter ends (622) in the example embodiment.

If yes, an instruction from cache/memory may be decoded (624). If a conditional branch instruction is decoded, a taken/not taken predictor may be updated (626) and a conditional branch taken/not taken prediction may be updated in the path information (603). If an indirect branch instruction is decoded, the method may select a next program counter (624), populate the program counter with the next program counter (601) and the method may begin (602) again.

Figure 7:
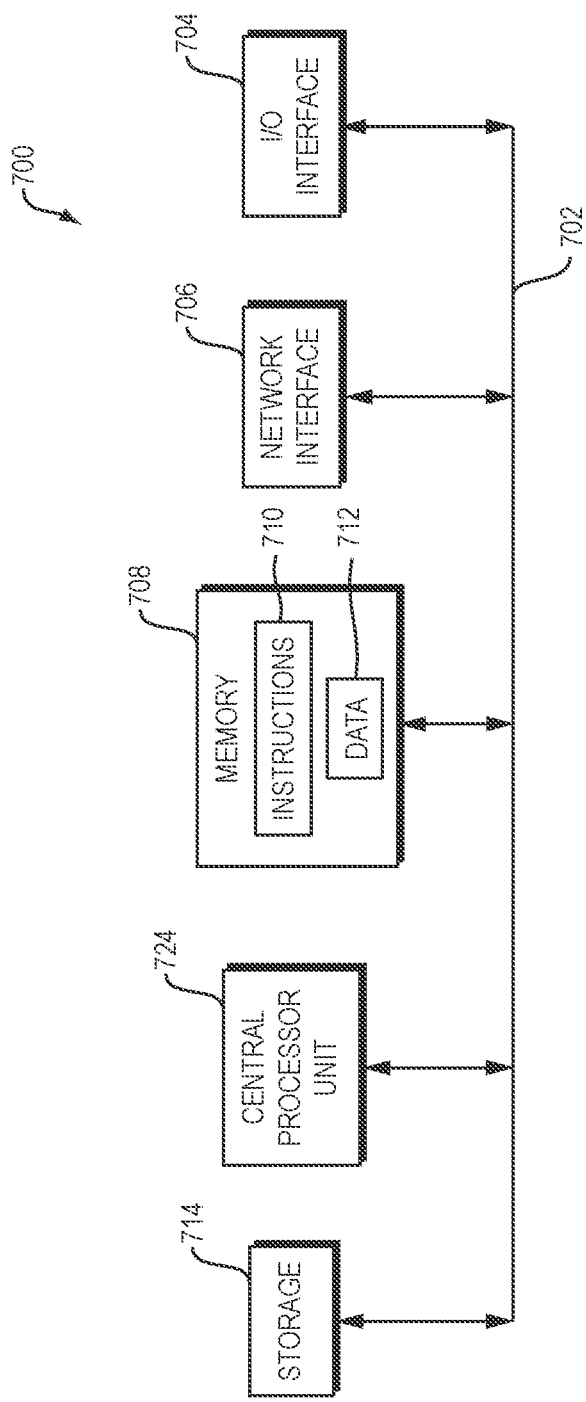
FIG. 7 is a block diagram of an example internal structure of a computer in which various embodiments of the present disclosure may be implemented.

FIG. 7 is a block diagram of an example of the internal structure of a computer 700 in which various embodiments of the present disclosure may be implemented. The computer 700 contains a system bus 702, where a bus is a set of hardware lines used for data transfer among the components of a computer or processing system. The system bus 702 is essentially a shared conduit that connects different elements of a computer system (e.g., processor, disk storage, memory, input/output ports, network ports, etc.) that enables the transfer of information between the elements. Coupled to the system bus 702 is an I/O device interface 704 for connecting various input and output devices (e.g., keyboard, mouse, displays, printers, speakers, etc.) to the computer 700. A network interface 706 allows the computer 700 to connect to various other devices attached to a network. Memory 708 provides volatile storage for computer software instructions 710 and data 712 that may be used to implement embodiments of the present disclosure. Disk storage 714 provides non-volatile storage for computer software instructions 710 and data 712 that may be used to implement embodiments of the present disclosure. A central processor unit 724 is also coupled to the system bus 702 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 7, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

While example embodiments have been particularly shown and described, it will be understood by those skilled in the art that various changes in form and details may be made therein without departing from the scope of the embodiments encompassed by the appended claims.

What is claimed is:

1. A branch predictor circuit comprising:
  a combined predictor table configured to store at least one tagged conditional branch prediction in combination with at least one tagged indirect branch target prediction, the at least one tagged indirect branch target prediction configured to include a predicted partial target address of a complete target address, the complete target address associated with an indirect branch instruction of a processor; and
  prediction logic configured to use the predicted partial target address to produce a predicted complete target address of the complete target address for use by the processor prior to execution of the indirect branch instruction.

2. The branch predictor circuit of claim 1, wherein production of the predicted complete target address causes the processor to advance execution to the predicted complete target address to prevent stalling of instruction execution otherwise incurred due to execution of the indirect branch instruction to compute the complete target address.

3. The branch predictor circuit of claim 1, wherein the combined predictor table is further configured to separate, on a row basis, the at least one tagged conditional branch prediction from the at least one tagged indirect branch target prediction.

4. The branch predictor circuit of claim 1, wherein:
  the at least one tagged indirect branch target prediction is further configured to include a source indicator specifying a location of one or more stored address bits; and
  wherein the prediction logic is further configured to combine the predicted partial target address with at least a portion of the one or more stored address bits, from the location specified, to form the predicted complete target address.

5. The branch predictor circuit of claim 4, wherein the prediction logic is further configured to:
  construct a least significant address portion, of the predicted complete target address, from the predicted partial target address; and
  construct a most significant address portion, of the predicted complete target address, from the at least a portion of the one or more stored address bits, from the location specified.

6. The branch predictor circuit of claim 4, further comprising at least one HighBits register configured to store the one or more stored address bits and wherein the source indicator is configured to specify the location as one of: the at least one HighBits register or a program counter of the processor.

7. The branch predictor circuit of claim 6, wherein the one or more stored address bits correspond to one or more higher order bits of a computed target address of an executed indirect branch instruction, the computed target address exceeding a given range relative to a value of the program counter prior to execution of the executed indirect branch instruction.

8. The branch predictor circuit of claim 7, further comprising training logic configured to write the HighBits register in the event the computed target address exceeds the given range.

9. The branch predictor circuit of claim 1, wherein the combined predictor table is indexed via a hash of at least a portion of bits of a program counter of the processor and path information, the at least a portion of bits of the program counter associated with a fetched conditional or indirect branch instruction fetched by the processor.

10. The branch predictor circuit of claim 9, wherein the path information includes branch-related information, non-branch related information, or a combination thereof.

11. The branch predictor circuit of claim 9, wherein the path information includes branch-related information that represents a program path taken by the processor to arrive at the fetched conditional or indirect branch instruction.

12. The branch predictor circuit of claim 9, wherein the path information includes non-branch related information that includes instruction information, subroutine information, or a combination thereof, the instruction information and subroutine information associated with one or more instructions or subroutines, respectively, encountered by the processor along a program path taken by the processor to arrive at the fetched conditional or indirect branch instruction.

13. The branch predictor circuit of claim 9, wherein the combined predictor table includes one or more banks, each of the one or more banks indexed with a different length of the path information employed in the hash.

14. The branch predictor circuit of claim 13, wherein the different length corresponds to a respective length of a series of one or more increasing lengths associated with the one or more banks, the series approximating a geometric series.

15. The branch predictor circuit of claim 1, wherein, in an event the processor fetches the indirect branch instruction, the prediction logic is configured to:
construct an index;
construct a tag; and
produce the predicted complete target address from (i) the predicted partial target address of a selected tagged indirect branch prediction selected from among the at least one tagged indirect branch prediction indexed by the index, the selected tagged indirect branch prediction including a matching tag that matches the tag constructed, the matching tag associated with a longest length of path information relative to lengths of path information associated with matching tags of the at least one tagged indirect branch prediction indexed by the index or (ii) the predicted partial target address of a default selection, the default selection selected from among the at least one tagged indirect branch prediction or a default address, in an event there is a tag miss.

16. The branch predictor circuit of claim 1, further comprising an exclusive conditional branch predictor table configured to store untagged conditional branch predictions, exclusively.

17. The branch predictor circuit of claim 16, wherein the prediction logic is further configured to select a conditional branch prediction from among entries of the exclusive conditional branch predictor table, and the at least one tagged conditional branch instruction of the combined predictor table, to produce a predicted direction for a conditional branch instruction for use by the processor prior to execution of the conditional branch instruction.

18. The branch predictor circuit of claim 16, wherein, in an event the processor fetches a conditional branch instruction, the prediction logic is configured to:
construct an index;
construct a tag; and
produce a conditional branch prediction for the conditional branch instruction from (i) a selected tagged conditional branch prediction selected from among the at least one tagged conditional branch prediction indexed by the index, the selected tagged conditional branch prediction including a matching tag that matches the tag constructed, the matching tag associated with a longest length of path information relative to lengths of path information associated with matching tags of the at least one tagged conditional branch prediction indexed by the index or (ii) an untagged conditional branch prediction of the exclusive conditional branch prediction table, the exclusive conditional branch prediction table indexed by a program counter of the processor, in an event there is a tag miss.

19. The branch predictor circuit of claim 18, wherein the exclusive conditional branch predictor table is indexed via at least a portion of bits of the program counter of the processor.

20. The branch predictor circuit of claim 1, wherein the at least one tagged conditional branch prediction and the at least one tagged indirect branch target prediction include respective tags constructed from a program counter of the processor and path information of a program path taken by the processor to arrive at a fetched conditional or indirect branch instruction, respectively.

21. The branch predictor circuit of claim 20, further comprising training logic, the training logic configured to:
construct the respective tags via a hash function applied to a first at least a portion of the program counter and a second at least a portion of the path information; and
store the at least one tagged conditional branch prediction and the at least one tagged indirect branch target prediction in the combined predictor table.

22. The branch predictor circuit of claim 1, further comprising training logic, the training logic configured to overwrite one or more of the at least one tagged conditional branch prediction with a given tagged indirect branch target prediction.

23. The branch predictor circuit of claim 22, wherein the training logic is further configured to overwrite the one or more of the at least one tagged conditional branch prediction as a function of a confidence indicator included in the one or more of the at least one tagged conditional prediction.

24. The branch predictor circuit of claim 23, wherein, in an event the confidence indicator is zero, the training logic is configured to overwrite the one or more of the at least one tagged conditional branch prediction with the given tagged indirect branch target prediction.

25. The branch predictor circuit of claim 23, wherein the training logic is further configured to increase or decrease the confidence indicator based on whether or not the predicted direction is a misprediction.

26. A method for performing branch prediction, the method comprising:
storing at least one tagged conditional branch prediction in combination with at least one tagged indirect branch target prediction in a combined predictor table, the at least one tagged indirect branch target prediction including a predicted partial target address of a complete target address, the complete target address associated with an indirect branch instruction of a processor; and
using the predicted partial target address to produce a predicted complete target address of the complete target address for use by the processor prior to execution of the indirect branch instruction.

27. The method of claim 26, further comprising causing execution of the processor to advance to the predicted complete target address to prevent stalling of instruction execution otherwise incurred due to execution of the indirect branch instruction to compute the complete target address.

28. The method of claim 26, further comprising separating, on a row basis, the at least one tagged conditional branch prediction from the at least one tagged indirect branch target prediction in the combined predictor table.

29. The method of claim 26, further comprising:
including a source indicator specifying a location of one or more stored address bits in the at least one tagged indirect branch target prediction; and
combining the predicted partial target address with at least a portion of the one or more stored address bits, from the location specified, to form the predicted complete target address.

30. The method of claim 29, further comprising:
constructing a least significant address portion, of the predicted complete target address, from the predicted partial target address; and
constructing a most significant address portion, of the predicted complete target address, from the at least a portion of the one or more stored address bits, from the location specified.

31. The method of claim 29, further comprising storing the one or more stored address bits in at least one HighBits register, the source indicator specifying the location as one of: the at least one HighBits register or a program counter of the processor.

32. The method of claim 31, wherein the one or more stored address bits correspond to one or more higher order bits of a computed target address of an executed indirect branch instruction, the computed target address exceeding a given range relative to a value of the program counter prior to execution of the executed indirect branch instruction.

33. The method of claim 32, further comprising writing the HighBits register in the event the computed target address exceeds the given range.

34. The method of claim 26, further comprising indexing the combined predictor table via a hash of at least a portion of bits of a program counter of the processor and path information, the at least a portion of bits of the program counter associated with a fetched conditional or indirect branch instruction fetched by the processor.

35. The method of claim 34, further comprising storing, in the path information, branch-related information, non-branch related information, or a combination thereof in the path information.

36. The method of claim 34, further comprising storing, in the path information, branch-related information that represents a program path taken by the processor to arrive at the fetched conditional or indirect branch instruction.

37. The method of claim 34, further comprising storing, in the path information, non-branch related information that includes instruction information, subroutine information, or a combination thereof, the instruction information and subroutine information associated with one or more instructions or subroutines, respectively, encountered by the processor along a program path taken by the processor to arrive at the fetched conditional or indirect branch instruction.

38. The method of claim 34, wherein the combined predictor table includes one or more banks and wherein the method further comprising indexing each of the one or more banks indexed with a different length of the path information employed in the hash.

39. The method of claim 38, wherein the different length corresponds to a respective length of a series of one or more increasing lengths associated with the one or more banks, the series approximating a geometric series.

40. The method of claim 26, further comprising:
fetching the indirect branch instruction;
constructing an index;
constructing a tag; and
producing the predicted complete target address from (i) the predicted partial target address of a selected tagged indirect branch prediction selected from among the at least one tagged indirect branch prediction indexed by the index, the selected tagged indirect branch prediction including a matching tag that matches the tag constructed, the matching tag associated with a longest length of path information relative to lengths of path information associated with matching tags of the at least one tagged indirect branch prediction indexed by the index or (ii) the predicted partial target address of a default selection, the default selection selected from among the at least one tagged indirect branch prediction or a default address, in an event there is a tag miss.

41. The method of claim 26, further comprising storing untagged conditional branch predictions, exclusively, in an exclusive conditional branch predictor table.

42. The method of claim 41, further comprising:
selecting a conditional branch prediction from among entries of the exclusive conditional branch predictor table and the at least one tagged conditional branch instruction of the combined predictor table; and
producing a predicted direction for a conditional branch instruction for use by the processor prior to execution of the conditional branch instruction.

43. The method of claim 42, further comprising:
fetching a conditional branch instruction;
constructing an index;
constructing a tag; and
producing a conditional branch prediction for the conditional branch instruction from (i) a selected tagged conditional branch prediction selected from among the at least one tagged conditional branch prediction indexed by the index, the selected tagged conditional branch prediction including a matching tag that matches the tag constructed, the matching tag associated with a longest length of path information relative to lengths of path information associated with matching tags of the at least one tagged conditional branch prediction indexed by the index or (ii) an untagged conditional branch prediction of the exclusive conditional branch prediction table, the exclusive conditional branch prediction table indexed by a program counter of the processor, in an event there is a tag miss.

44. The method of claim 43, further comprising indexing the exclusive conditional branch predictor table via at least a portion of bits of the program counter of the processor.

45. The method of claim 26, further comprising storing, in the at least one tagged conditional branch prediction and the at least one tagged indirect branch target prediction, respective tags constructed from a program counter of the processor and path information of a program path taken by the processor to arrive at a fetched conditional or indirect branch instruction, respectively.

46. The method of claim 45, further comprising:
constructing the respective tags via a hash function applied to a first at least a portion of the program counter and a second at least a portion of the path information; and
storing the at least one tagged conditional branch prediction and the at least one tagged indirect branch target prediction in the combined predictor table.

47. The method of claim 26, further comprising overwriting one or more of the at least one tagged conditional branch prediction with a given tagged indirect branch target prediction.

48. The method of claim 47, further comprising overwriting the one or more of the at least one tagged conditional branch prediction as a function of a confidence indicator included in the one or more of the at least one tagged conditional branch prediction.

49. The method of claim 48, further comprising overwriting the one or more of the at least one tagged conditional branch prediction with the given tagged indirect branch target prediction in an event the confidence indicator is zero.

50. The method of claim 48, further comprising increasing or decreasing the confidence indicator based on whether or not the predicted direction is a misprediction.

51. A non-transitory computer-readable medium having encoded thereon a sequence of instructions which, when executed by a processor, causes the processor to:
- store at least one tagged conditional branch prediction in combination with at least one tagged indirect branch target prediction in a combined predictor table, the at least one tagged indirect branch target prediction including a predicted partial target address of a complete target address, the complete target address associated with an indirect branch instruction of the processor; and
- use the predicted partial target address to produce a predicted complete target address of the complete target address for use by the processor prior to execution of the indirect branch instruction.

\* \* \* \* \*

UNITED STATES PATENT AND TRADEMARK OFFICE
CERTIFICATE OF CORRECTION

PATENT NO. : 10,776,119 B2
APPLICATION NO. : 16/009826
DATED : September 15, 2020
INVENTOR(S) : Edward J. McLellan, David A. Carlson and Rohit P. Thakar Page 1 of 1

It is certified that error appears in the above-identified patent and that said Letters Patent is hereby corrected as shown below:

On the Title Page

In Item (71), under "Applicant", delete "MARVELL ASIA PTE. LTD.," and insert --MARVELL ASIA PTE, LTD.,--

In the Specification

In Column 12, Line 66, delete "L(1)" and insert --L(i)--

Signed and Sealed this
Fourth Day of July, 2023

Katherine Kelly Vidal
*Director of the United States Patent and Trademark Office*